June 30, 1936. C. J. WOODS 2,046,298
FILTER TILE
Filed Aug. 31, 1933
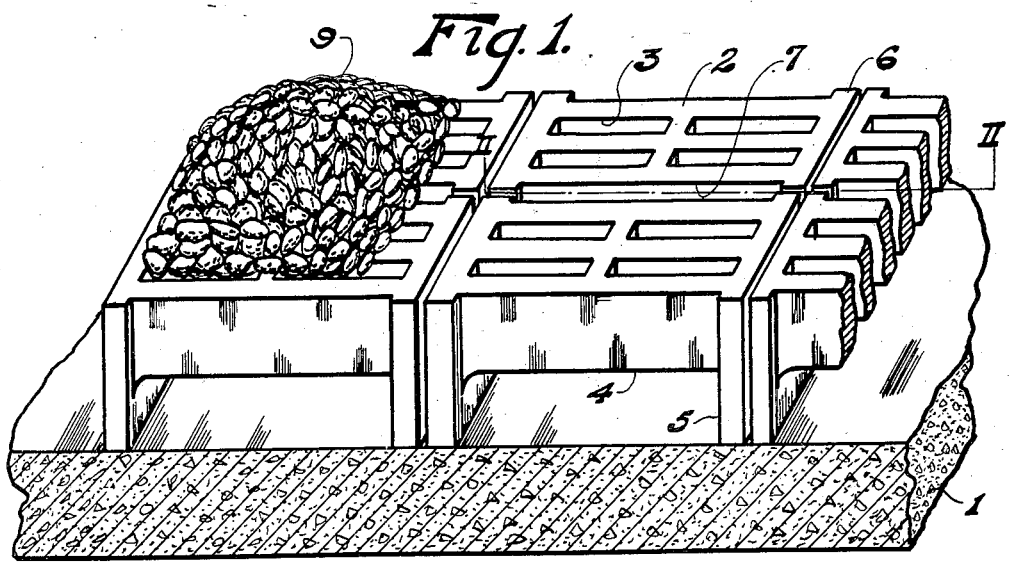
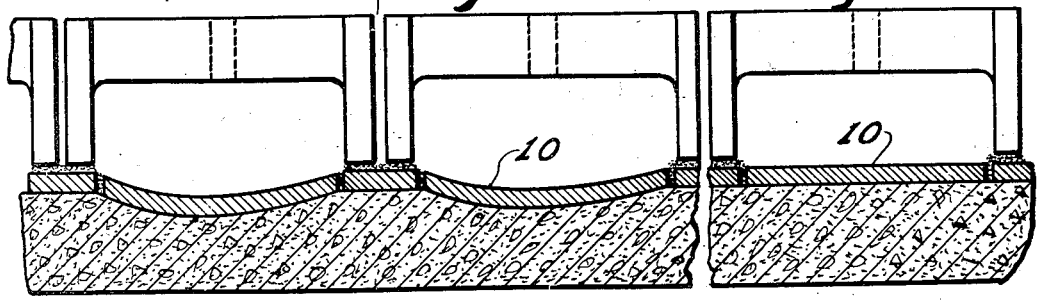
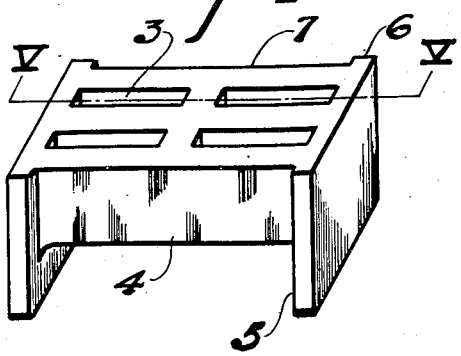
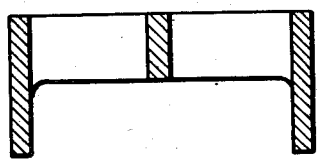
INVENTOR
Charles J. Woods
by William B. Jaspert
Attorney.

Patented June 30, 1936

2,046,298

UNITED STATES PATENT OFFICE 2,046,298

FILTER TILE

Charles J. Woods, Syracuse, N. Y., assignor to National Fireproofing Corporation, Pittsburgh, Pa., a corporation of Pennsylvania Application August 31, 1933, Serial No. 687,624

2 Claims. (Cl. 210—148)

This invention relates to improvements in grid blocks or tile for use in the construction of trickling filter floors adapted for supporting the filter bed, and it is among the primary objects of the invention to provide a combination grid block and trough tile integrally formed to take the place of separate units heretofore employed, and which shall be constructed in the form of an open grid having its lower portion cut-away to form a trough, the members being symmetrically formed so that when assembled they provide maximum strength and rigidity with a maximum degree of flow passage.

The conventional so-called trickling filter bed structure consists of a concrete floor with proper slope upon which are mounted a series of trough tile which in turn support the grid block upon which the coarse material such as clinkers or gravel or stone is placed, the combined structure functioning to permit the trickle of sewage effluent for aerating and purifying the same before it is discharged into an open water course.

A filter block suitable for this construction must have sufficient vertical opening for the liquid to pass down through, and a horizontal opening allowing it to run off.

Most prior art structures accomplish this function with two units, and in accordance with the present invention, the grid block is designed to have its bottom portion cut away to form legs, leaving a channel, while having its top portion provided with the vertical slots forming a grid for supporting the filtering material.

The block is further designed for use with various arrangements of glazed tile slabs to form flow channels, and the blocks are formed of vitreous material to prevent any chemical reaction or deterioration of the concrete base on which it is supported.

In the drawing constituting a part hereof, and in which like reference characters designate like parts:—

Figure 1 is a broken perspective view showing a filter block bed for sewage systems or the like illustrating the type of combination grid flow tile blocks embodying the principles of this invention;

Figure 2 a vertical longitudinal sectional view taken along the line II—II of Figure 1;

Figure 3 a modified form of the structure shown in Figure 2;

Figure 4 a perspective view of a combined grid and flow tile unit; and,

Figure 5 a vertical longitudinal sectional view taken along the lines V—V of Figure 4.

In the drawing, the reference numeral 1 designates a concrete bed which constitutes a support, the bed being sloped in one direction to provide for the free drainage of the sewage effluent. Mounted on the bed 1 are a series of tile units generally designated by the reference numeral 2, the units having their upper portion provided with vertical slots 3, and their bottom portion cut-out in a direction transversely of the slot to substantially half their depth as shown by the numeral 4, the cut-out portion forming legs 5. One of the features of the grid trough tile is the formation of flanges 6 which constitute spacing abutments for adjacent tile which, when joined in the manner shown in Figure 1, produces a relatively long shot 7 of substantially the proportions of the slot 3 with the exception of their length.

The blocks are preferably spaced in the manner shown in Figures 1 to 3 of the drawing so that the adjacent faces of the tile do not contact but leave a space 8 which further aids in permitting the vertical flow of the sewage effluent to the drainage base 1.

The tile when mounted are adapted to support a bed of coarse rock or gravel 9 which is of substantial depth therefor requiring that the vertical section of the block be of such proportions as to prevent against any failure or collapse of the grid portion of the tile.

In Figure 2 of the drawing, the tile are shown as mounted on vitreous slabs designated by the reference numeral 10 which may be convex as shown in Figure 2 or plain as shown in Figure 3, their object being to provide a vitreous surface which permits the free flow of the effluent without any congestion in the flow channels between the legs 5 of the block.

As shown in Figures 4 and 5, the blocks are of a symmetrical construction making them strong and rugged and yet providing a maximum vertical drainage, the tile being interchangeable, and require no particular matching or mounting with other cooperative units as is customary in the conventional form of trickling filters. The tile may be readily cleansed by applying a flowing stream of cleansing fluid both in a vertical direction and horizontally through the channels constituted by the leg members 5 of the tile, and with the relatively large slots in the members and between adjacent members adequate aeration is provided for.

I claim:—

1. In a trickling filter, a rigid concrete floor having a smooth top surface grooved to form under drains, vitrified slabs of the shape of said grooves disposed therein, vitrified spacing slabs disposed between said grooved slabs, and a series of integrally formed grill and trough blocks mounted end to end on said floor, said blocks having aligning slots for the passage of the effluent from a trickling filter bed supported by the blocks toward the floor and having flat top and bottom surfaces that parallel said floor spaced from the floor by integral legs mounted on said vitrous spacing slabs, said legs combining with the bottom surface of the blocks to form an arched under drain to carry the filtered effluent toward the final disposal point.

2. In a trickling filter, a rigid concrete floor having a smooth top surface to form an under-drain, relatively wide and narrow vitrified slabs alternately spaced on said floor, and a series of integrally formed grill and trough blocks mounted end to end on said floor, said blocks having aligning slots for the passage of the effluent from a trickling filter bed supported by the blocks toward the floor and having flat top and bottom surfaces that parallel said floor spaced from the floor by integral legs mounted on the narrow vitrous slabs, said legs combining with the bottom surface of the blocks to form an arched under-drain to carry the filtered effluent toward the final disposal point.

CHARLES J. WOODS.